US012807837B2

(12) United States Patent
Kawai et al.

(10) Patent No.: US 12,807,837 B2
(45) Date of Patent: Nov. 24, 2026

(54) PHOTOCATALYTIC COATING AGENT, PHOTOCATALYTIC FILM, DISPLAY DEVICE, AND BINDER SYNTHESIS METHOD

(71) Applicant: SHARP KABUSHIKI KAISHA, Sakai City (JP)

(72) Inventors: Hidetsugu Kawai, Sakai City (JP); Masafumi Ikari, Yasu City (JP); Masao Morimoto, Yasu City (JP); Yasuhiro Shibai, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 731 days.

(21) Appl. No.: 18/215,233

(22) Filed: Jun. 28, 2023

(65) Prior Publication Data

US 2024/0010871 A1 Jan. 11, 2024

(30) Foreign Application Priority Data

Jul. 6, 2022 (JP) ................................ 2022-109152

(51) Int. Cl.
*C09D 183/06* (2006.01)

(52) U.S. Cl.
CPC ................................ *C09D 183/06* (2013.01)

(58) Field of Classification Search
None
See application file for complete search history.

(56) References Cited

U.S. PATENT DOCUMENTS

| | | | | |
|---|---|---|---|---|
| 6,756,124 B2 * | 6/2004 | Kanamori | C09D 183/04 | 524/588 |
| 7,959,980 B2 * | 6/2011 | Nakajima | C09D 5/1618 | 427/372.2 |
| 8,344,238 B2 * | 1/2013 | Gronet | H10F 77/311 | 136/246 |
| 2005/0266981 A1 * | 12/2005 | Nakajima | C09D 5/1618 | 427/372.2 |
| 2010/0326495 A1 * | 12/2010 | Gronet | H10F 77/311 | 136/246 |
| 2012/0237396 A1 | 9/2012 | Miki et al. | | |
| 2026/0055282 A1 * | 2/2026 | Tsutsumino | C09D 7/61 | |

FOREIGN PATENT DOCUMENTS

| | | | | |
|---|---|---|---|---|
| JP | H10-33988 A | 2/1998 | | |
| JP | 2002-363489 A | 12/2002 | | |
| JP | 2005-113023 A | 4/2005 | | |
| JP | 2006-111652 A | 4/2006 | | |
| JP | 2008-500433 A | 1/2008 | | |
| JP | 2009-280709 A | 12/2009 | | |
| JP | 2011-079980 A | 4/2011 | | |
| JP | 2011-111600 A | 6/2011 | | |
| JP | 2021-059734 A | 4/2021 | | |
| JP | 2022011583 A * | 1/2022 | | G02B 1/18 |
| WO | 2005118724 A1 | 12/2005 | | |
| WO | WO-2009133591 A1 * | 11/2009 | | C09D 183/04 |

* cited by examiner

*Primary Examiner* — Sanza L. McClendon
(74) *Attorney, Agent, or Firm* — ScienBiziP, P.C.

(57) ABSTRACT

A photocatalytic coating agent of the present disclosure includes a liquid medium, photocatalyst particles, and a binder, in which the binder is a hydrolysis condensate of a tetraalkoxysilane and is a long-chain siloxane compound.

12 Claims, 2 Drawing Sheets

PHOTOCATALYTIC COATING AGENT, PHOTOCATALYTIC FILM, DISPLAY DEVICE, AND BINDER SYNTHESIS METHOD

BACKGROUND OF THE INVENTION

Field of the Invention

The present disclosure relates to a photocatalytic coating agent, a photocatalytic film, a display device, and a binder synthesis method.

Description of the Background Art

Photocatalysts provide photocatalytic activity upon receiving light. This photocatalytic activity can remove harmful substances in air, such as volatile organic compounds (VOCs) and inactivate allergens (for example, see prior art). In the prior art, a hydrolysis condensate of a tetraalkoxysilane is used as a binder for a photocatalytic coating layer. The use of such a binder makes it possible to suppress oxidative degradation of the binder through photocatalytic activity.

In addition, optical films to be attached to a display are known (for example, see prior art).

When a hydrolysis condensate of a tetraalkoxysilane is used as a binder for a photocatalytic coating layer, since the hydrolysis condensate has a three-dimensional mesh shape, the viscosity of the coating agent increases, and the roughness of the surface of the photocatalytic coating layer increases. When such a photocatalytic coating layer is formed on a surface of an optical film, the haze of the optical film increases. As a result, the optical film becomes cloudy, and the transparency thereof decreases.

The present disclosure has been made in view of such circumstances and provides a photocatalytic coating agent capable of forming a photocatalytic coating layer with small surface roughness.

SUMMARY OF THE INVENTION

The present disclosure provides a photocatalytic coating agent including a liquid medium, photocatalyst particles, and a binder, in which the binder is a hydrolysis condensate of a tetraalkoxysilane and is a long-chain siloxane compound.

Since the photocatalytic coating agent of the present disclosure includes photocatalyst particles and, as a binder, a hydrolysis condensate of a tetraalkoxysilane, a photocatalytic coating layer having excellent photocatalytic activity, high hardness, excellent scratch resistance, and excellent antiviral activity can be formed by applying the photocatalytic coating agent of the present disclosure on a base material and drying same.

Since the hydrolysis condensate of a tetraalkoxysilane (binder) included in the photocatalytic coating agent of the present disclosure is a long-chain siloxane compound, even when the photocatalytic coating agent includes the binder in a sufficient amount, the viscosity of the photocatalytic coating agent is prevented from increasing. Consequently, the surface roughness of the photocatalytic coating layer formed can be decreased, and the haze of an optical film including this photocatalytic coating layer can be prevented from increasing. Haze is a value calculated from the ratio of diffused transmission light to total light transmission light and is affected by film surface roughness. In addition, the higher the haze is, the cloudier the film becomes, and the lower the transparency is.

DESCRIPTION OF THE PREFERRED EMBODIMENTS

Figure 1:
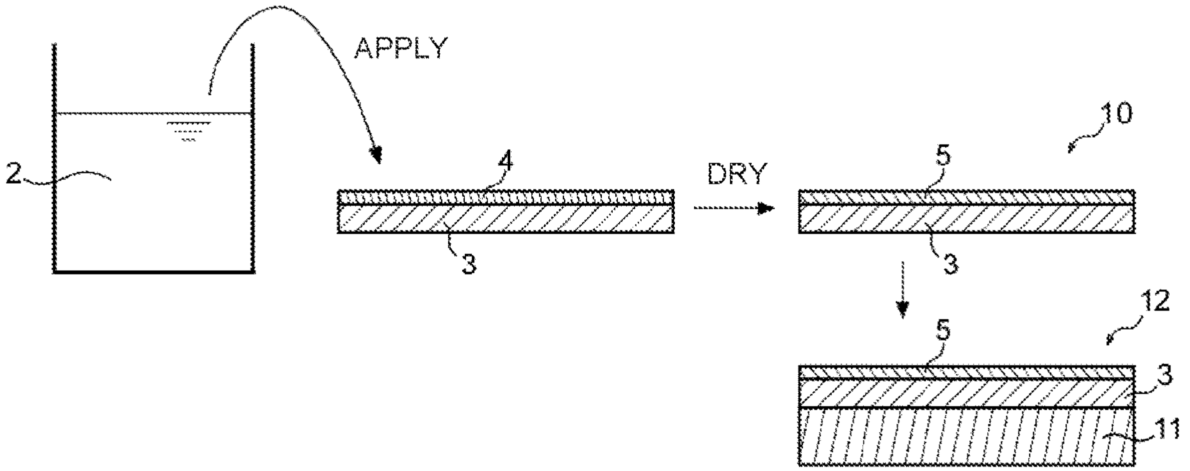
FIG. 1 is an illustrative diagram of a method of forming a photocatalytic film using a photocatalytic coating agent of the present disclosure.

A photocatalytic coating agent of the present disclosure includes a liquid medium, photocatalyst particles, and a binder, and the photocatalytic coating agent is characterized in that the binder is a hydrolysis condensate of a tetraalkoxysilane and is a long-chain siloxane compound.

The binder preferably has a polymer structure with which the viscosity at 20° C. of a dispersion liquid in which 10 wt % of the hydrolysis condensate is dispersed in ethanol becomes 2.0 cps or more and 4.0 cps or less. Consequently, the viscosity of the photocatalytic coating agent can be decreased, and the surface roughness of the photocatalytic coating layer formed can be decreased. As a result, the haze of an optical film including this photocatalytic coating layer can be prevented from increasing.

The viscosity of the photocatalytic coating agent is preferably 1.0 cps or more and 10.0 cps or less. Consequently, the surface roughness of a photocatalytic coating layer formed can be decreased, and the haze of an optical film including this photocatalytic coating layer can be prevented from increasing. The viscosity of the photocatalytic coating agent is a viscosity at an arbitrary point of time between production of the photocatalytic coating agent and use of the photocatalytic coating agent.

The liquid medium preferably includes water and an alcohol, and the weight ratio of the alcohol in the photocatalytic coating agent is preferably 20 wt % or more and 70 wt % or less. Consequently, stability of the photocatalytic coating agent can be improved.

The photocatalytic coating agent preferably includes a fluororesin. The surface smoothness (flowability) of a photocatalytic coating layer formed by drying an application layer of this photocatalytic coating agent can be improved, and the haze can be decreased even when the proportion of the photocatalyst particles in the photocatalytic coating layer is high and an antiviral activity value is high. Furthermore, scratch resistance (printing durability) of the photocatalytic coating layer can be improved.

The photocatalytic coating agent preferably includes inorganic compound fine particles, and the inorganic compound fine particles preferably include one or more of zirconia fine particles, copper fine particles, silica fine particles, silver fine particles, and silver compound fine particles. Consequently, stability of the photocatalytic coating agent can be improved. The photocatalytic coating agent preferably includes a cyclodextrin clathrate. Consequently, stability of the photocatalytic coating agent can be improved.

The present disclosure also provides a photocatalytic film including a base film and a photocatalytic coating layer provided on the base film. The photocatalytic coating layer is a layer obtained by drying an application layer of the photocatalytic coating agent of the present disclosure and includes the photocatalyst particles and the binder.

A thickness of the photocatalytic coating layer is preferably 0.1 μm or more and 5.0 μm or less. The photocatalytic coating layer preferably includes a fluororesin, and a content of the fluororesin in the photocatalytic coating layer is preferably 10 wt % or more and 40 wt % or less. A display device of the present disclosure includes the photocatalytic film of the present disclosure.

The present disclosure also provides a binder synthesis method including a first step of mixing a tetraalkoxysilane, an alcohol, and water and advancing hydrolysis reaction and dehydration condensation reaction, and a second step of adding water to a mixture prepared in the first step to further advance hydrolysis reaction and dehydration condensation reaction, in which a mixing ratio between the tetraalkoxysilane and water in the first step is set such that an amount of water is 0.5 mol or more and 1 mol or less based on 1 mol of the tetraalkoxysilane. A siloxane compound can be grown into a long thin shape, and the siloxane compound can be a long chain by this method. In addition, the siloxane compound can be prevented from growing three-dimensionally, and the viscosity of the mixture liquid can be prevented from increasing.

The first step is preferably a step of mixing a tetraalkoxysilane, an alcohol, water, and an acid catalyst and advancing hydrolysis reaction and dehydration condensation reaction at a temperature equal to or more than a freezing temperature and equal to or less than 20° C. Consequently, increase of branches in the siloxane compound can be suppressed, and increase in the viscosity of the mixture liquid can be suppressed.

Preferably, the first step is a step of mixing a tetraalkoxysilane, an alcohol, water, and an acid catalyst and advancing hydrolysis reaction and dehydration condensation reaction, and the second step is a step of adding water and an acid catalyst to a mixture prepared in the first step to further advance hydrolysis reaction and dehydration condensation reaction, in which the amount of the acid catalyst added in the second step is larger than the amount of the acid catalyst mixed in the first step. Consequently, the molecular weight of the siloxane compound can be increased in the second step, and scratch resistance (printing durability) of the photocatalytic coating layer can be improved.

Hereinafter, an embodiment of the present disclosure will be described with reference to drawings. The configurations illustrated in the drawings and the description below are illustrative, and the scope of the present disclosure is not limited to those shown in the drawings and the description below.

The present embodiment provides a photocatalytic coating agent, a photocatalytic film, a display device, and a binder synthesis method. FIG. 1 is an illustrative diagram of a method of forming a photocatalytic film and a display device using a photocatalytic coating agent of the present embodiment.

A photocatalytic coating agent 2 of the present embodiment includes a liquid medium, photocatalyst particles, and a binder, and the binder is a hydrolysis condensate of a tetraalkoxysilane and is a long-chain siloxane compound.

The photocatalytic coating agent 2 may include at least one of a fluororesin, inorganic fine particles, and a cyclodextrin clathrate.

A viscosity of the photocatalytic coating agent 2 is, for example, 1.0 cps or more and 10.0 cps or less and preferably 1.0 cps or more and 8.0 or less.

A binder synthesis method of the present embodiment includes a first step of mixing a tetraalkoxysilane, an alcohol, and water and advancing hydrolysis reaction and dehydration condensation reaction, and a second step of adding water to a mixture prepared in the first step to further advance hydrolysis reaction and dehydration condensation reaction, in which a mixing ratio between the tetraalkoxysilane and water in the first step is set such that the amount of water is 0.5 mol or more and 1 mol or less based on 1 mol of the tetraalkoxysilane. The photocatalytic coating agent 2 can be prepared by adding, to a mixture including the binder prepared as described above, photocatalyst particles, water, and the like and mixing same.

A photocatalytic film 10 of the present embodiment includes a base film 3 and a photocatalytic coating layer 5 provided on the base film 3. The photocatalytic coating layer 5 is a layer obtained by drying an application layer 4 of the photocatalytic coating agent 2 of the present embodiment and includes the photocatalyst particles and the binder. Although the method of applying the photocatalytic coating agent 2 is not particularly limited, examples thereof include application using a film applicator, spray application, a spin coating method, and a dip coating method.

The base film 3 is a film functioning as a base for the photocatalytic film 10. The base film 3 is, for example, an optical film such as a PET film, a triacetate cellulose film, a cyclo-olefin polymer film, or a urethane resin film.

A thickness of the photocatalytic coating layer is 0.1 μm or more and 5.0 μm or less, preferably 0.3 μm or more and 3.0 μm or less, and more preferably 0.5 μm or more and 1.0 μm or less. Consequently, the photocatalytic coating layer 5 can have high photocatalytic activity, and the haze of the photocatalytic film 10 can be prevented from increasing.

The liquid medium included in the photocatalytic coating agent 2 is a medium or a dispersing medium for the photocatalytic coating agent 2. The liquid medium preferably includes water. In addition, the liquid medium may be a mixture liquid of water and an alcohol (for example, ethanol). The liquid medium may be a mixture of a liquid (for example, water an alcohol) included in the mixture liquid including the binder and a liquid (for example, water an alcohol) added in preparing the photocatalytic coating agent 2.

The proportion of water in the photocatalytic coating agent 2 is, for example, 20 wt % or more and 60 wt % or less and preferably 35 wt % or more and 55 wt % or less.

The proportion of the alcohol in the photocatalytic coating agent 2 is, for example, 20 wt % or more and 70 wt % or less, preferably 30 wt % or more and 70 wt % or less, and more preferably 40 wt % or more and 60 wt % or less. Consequently, stability of the photocatalytic coating agent 2 can be improved.

The photocatalyst particles (photocatalyst powder) are particles exhibiting photocatalytic activity upon receiving light and are dispersed in the liquid medium. The photocatalyst particles may be titanium oxide ($TiO_2$) particles or tungsten oxide ($WO_3$) particles but are preferably tungsten oxide particles. Tungsten oxide has a light absorption band wider than titanium oxide and exhibits photocatalytic activity upon receiving visible light. Thus, tungsten oxide can exhibit photocatalytic activity upon receiving light from a display such as a liquid crystal display, an organic EL display, a plasma display, and a micro LED display to oxidize organic matters such as viruses.

Tungsten oxide particles ($WO_3$ particles) as the photocatalyst particles may have a composition deviating from the stoichiometric composition as long as the tungsten oxide particles have photocatalytic activity. The tungsten oxide particles may also contain impurity atoms or additive atoms unless the photocatalytic activity is lost. The photocatalyst particles may also have, on the surfaces thereof, an auxiliary catalyst that reduces an energy gap of the photocatalyst particles to increase responsiveness in the visible light region. The auxiliary catalyst includes, for example, platinum-group metals such as Pt, Pd, Rh, Ru, Os, and Ir.

An average particle diameter (median diameter D50, particle diameter at 50 vol % in cumulative distribution, or BET particle diameter) of the tungsten oxide particles (primary particles) is preferably 1 nm or more and 500 nm or less and more preferably 5 nm or more and 200 nm or less. A secondary particle diameter of the tungsten oxide particles is preferably 100 nm or more and 1000 μm or less. The average particle diameter of the photocatalyst particles can be measured by a BET specific surface meter, a laser diffraction type particle size distribution meter, a dynamic light-scattering type particle size distribution meter, and the like. A proportion of the tungsten oxide particles in the photocatalytic coating agent 2 is preferably 0.1 wt % or more and 6.0 wt % or less and more preferably 1 wt % or more and 5.0 wt % or less. A proportion of the tungsten oxide particles in the photocatalytic coating layer 5 formed by drying the application layer 4 of the photocatalytic coating agent 2 is 25 wt % or more and 55 wt % or less and preferably 35 wt % or more and 52 wt % or less.

The binder included in the photocatalytic coating agent 2 is a hydrolysis condensate of a tetraalkoxysilane (for example, tetraethoxysilane) and is a long-chain siloxane compound. The binder is preferably a siloxane compound having a linear portion.

The binder can have a polymer structure with which the viscosity at 20° C. of a dispersion liquid in which 10 wt % of the hydrolysis condensate is dispersed in ethanol is 2.0 cps or more and 4.0 cps or less. Consequently, the binder can be prevented from being decomposed by photocatalytic activity, and the viscosity of the photocatalytic coating agent 2 can be prevented from increasing. Thus, the surface roughness of the photocatalytic coating layer 5 formed can be decreased, and the haze of the photocatalytic film 10 including this photocatalytic coating layer 5 can be prevented from increasing.

The long-chain siloxane compound refers to a compound having a long-chain portion with continuous siloxane bonds (for example, a compound having a chain with several dozen or more of continuous siloxane bonds), may be a linear siloxane compound, may be a branched siloxane compound, and may be a siloxane compound with an irregular chain. For example, the long-chain siloxane can include the chemical structure illustrated in FIG. 2.

Figure 2:
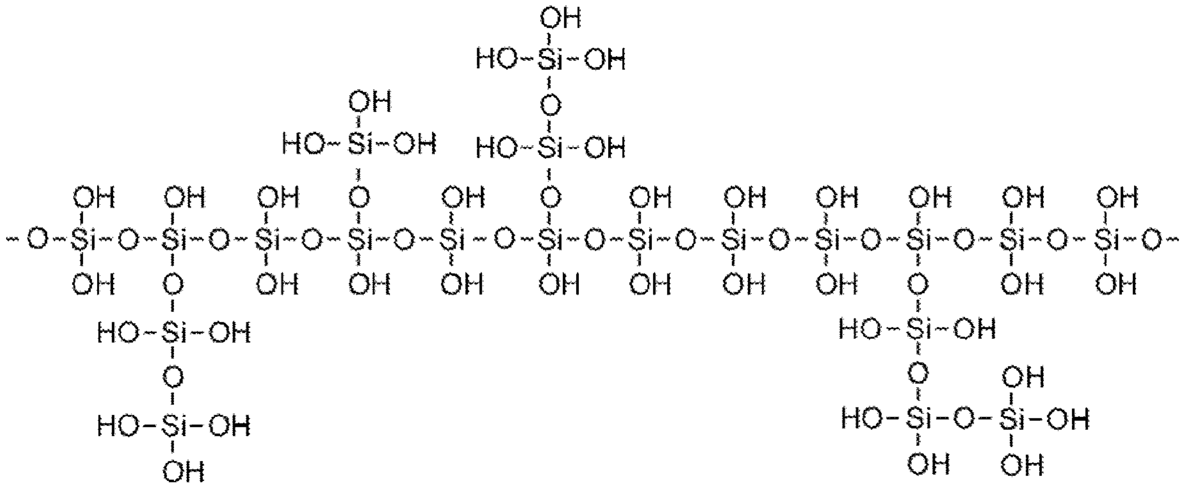
FIG. 2 is a diagram illustrating an example of a chemical structure included in a long-chain siloxane compound.

While FIG. 2 illustrates a chemical structure in which hydroxy groups bind to silicon atoms, these hydroxy groups may undergo dehydration condensation reaction with hydroxy groups on the surfaces of the photocatalyst particles. In this case, the long-chain siloxane compound chemically binds to the surfaces of the photocatalyst particles.

When the base film 3 or an intermediate layer disposed between the base film 3 and the photocatalytic coating layer 5 has hydroxy groups at the interface with the photocatalytic coating layer 5, hydroxy groups included in the long-chain siloxane compound may undergo dehydration condensation reaction with hydroxy groups of the base film 3 or the intermediate layer. In this case, the long-chain siloxane compound chemically binds to the base film 3 or the intermediate layer.

Figure 3:
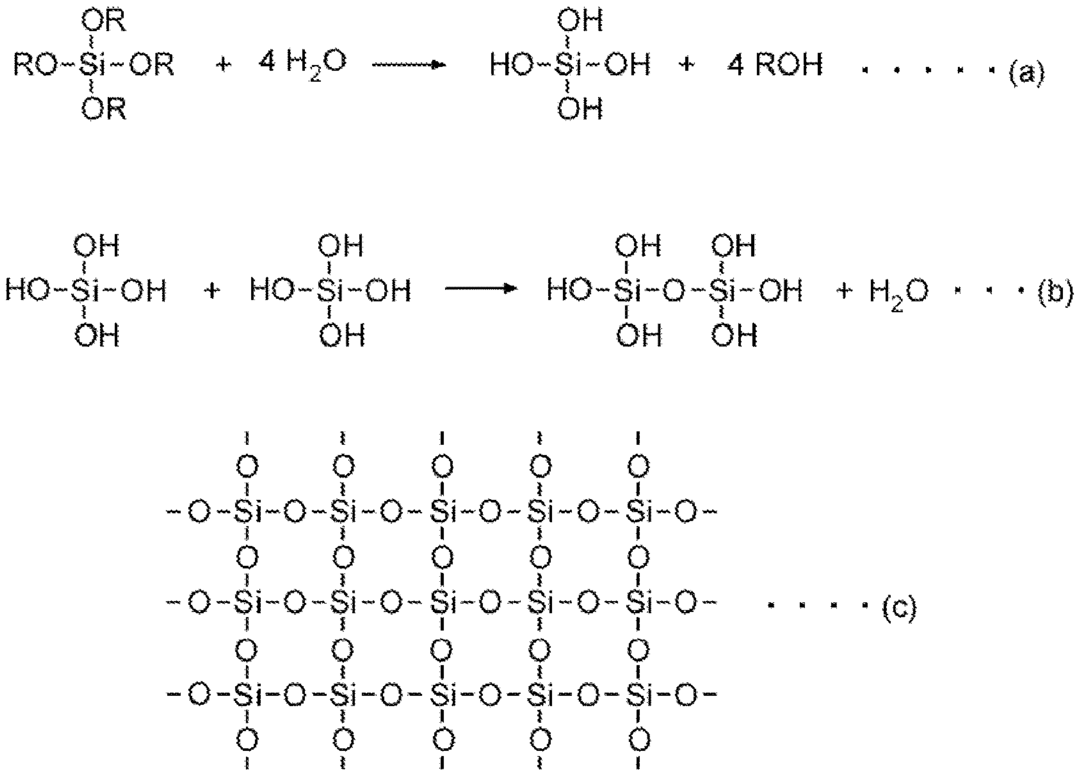
FIG. 3 is a schematic diagram of chemical reaction formulae of hydrolysis reaction and condensation reaction of a tetraalkoxysilane, and a chemical structure of a hydrolysis condensate of the tetraalkoxysilane.

The tetraalkoxysilane $Si(OR)_4$ has a chemical structure in which four alkoxy groups (—OR) bind to a silicon atom (Si). When $Si(OR)_4$ and water are mixed, $Si(OR)_4$ hydrolyzes as in the chemical reaction formula (a) in FIG. 3. The silicon compound generated through such hydrolysis three-dimensionally grows through dehydration condensation reaction as in the chemical reaction formula (b) in FIG. 3 to form $SiO_2$ (glass) with a three-dimensional network structure as in FIG. 3(*c*). Incidentally, while hydrolysis reaction and dehydration condensation reaction are separately described in FIG. 3, dehydration condensation reaction proceeds simultaneously with hydrolysis reaction in practice. The amount of water ($H_2O$) required to change substantially all $Si(OR)_4$ moieties into $SiO_2$ is 2 mol based on 1 mol of $Si(OR)_4$. When hydrolysis and condensation reaction proceeds in a state where 2 mol or more of water exists based on 1 mol of $Si(OR)_4$, as illustrated in FIG. 3, $SiO_2$ (sol or gel) with a three-dimensional network structure is formed.

Figure 4:
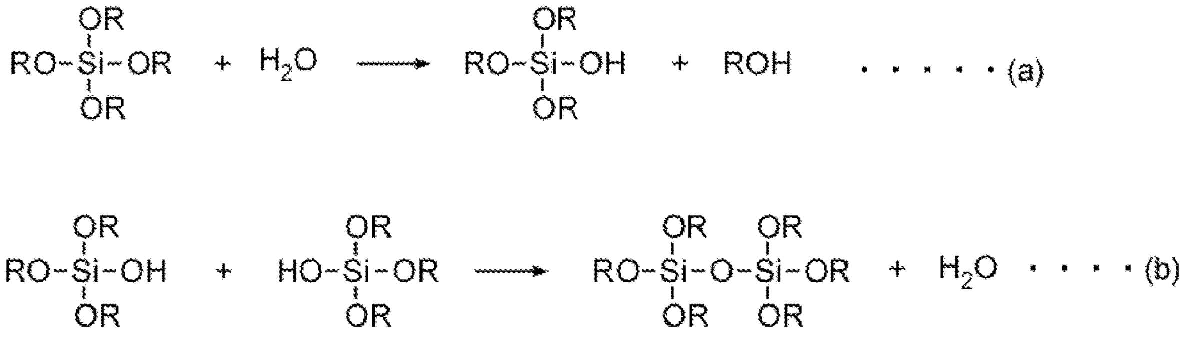
FIG. 4 shows chemical reaction formulae of hydrolysis reaction and condensation reaction of a tetraalkoxysilane.

When hydrolysis and condensation reaction proceeds in a state where the amount of water ($H_2O$) is small relative to $Si(OR)_4$ (first step), as in the chemical reaction formula (a) in FIG. 4, hydrolysis reaction proceeds with part of the four alkoxy groups of the tetraalkoxysilane, and the part of the alkoxy groups subjected to hydrolysis reaction is substituted by a hydroxy group. As in the chemical reaction formula (b) in FIG. 4, hydroxy groups produced through hydrolysis reaction undergo dehydration condensation reaction, causing polymerization of a silane compound to produce the siloxane compound and water ($H_2O$). Water thus produced is used for hydrolysis reaction as in the chemical reaction formula (a) in FIG. 4. In this way, by sequentially repeating hydrolysis reaction and dehydration condensation reaction, the siloxane compound grows into a long thin shape. The siloxane compound continues to grow until water runs out (first hydrolysis condensation reaction). A time taken for advancing the first hydrolysis condensation reaction (time during which the temperature is maintained and stirring is continued) can be 2 hours or longer and 15 hours or shorter, for example.

In the first hydrolysis condensation reaction (first step), $Si(OR)_4$, an alcohol (for example, ethanol), and water can be mixed to advance hydrolysis reaction and dehydration condensation reaction. Consequently, separation between $Si(OR)_4$ and water can be prevented, and hydrolysis reaction and dehydration condensation reaction can be evenly advanced. In the first hydrolysis condensation reaction, $Si(OR)_4$, an alcohol, water, and an acid catalyst (for example, hydrochloric acid) can be mixed to advance hydrolysis reaction and dehydration condensation reaction. Consequently, the first hydrolysis condensation reaction can be advanced at an adequate reaction rate.

In the first hydrolysis condensation reaction (first step), hydrolysis reaction and dehydration condensation reaction can be advanced at a temperature equal to or more than a freezing temperature and equal to or less than 20° C. Consequently, increase of branches in the siloxane compound can be suppressed, and increase in the viscosity of the mixture liquid can be suppressed.

A mixing ratio between $Si(OR)_4$ and water in the first hydrolysis condensation reaction (first step) can be adjusted such that the amount of water is 0.5 mol or more and 1 mol or less based on 1 mol of $Si(OR)_4$, preferably 0.6 mol or more and 0.9 mol or less based on 1 mol of $Si(OR)_4$, and more preferably 0.7 mol or more and 0.8 mol or less based on 1 mol of $Si(OR)_4$. Consequently, the siloxane compound can be grown into a long thin shape, and the siloxane compound can be a long chain. In addition, the siloxane compound can be prevented from growing three-dimensionally, and the viscosity of the mixture liquid can be prevented from increasing.

After the first hydrolysis condensation reaction is advanced until water substantially runs out, water and an acid catalyst can be added to the mixture after reaction to further advance hydrolysis reaction and dehydration condensation reaction (second step, second hydrolysis condensation reaction). The binder (hydrolysis condensate of $Si(OR)_4$) is synthesized by completing the second hydrolysis condensation reaction. This binder is a long-chain siloxane compound.

Also in the second hydrolysis condensation reaction, the siloxane compound grows into a long thin shape because hydrolysis and condensation reaction proceeds in a state where the amount of water ($H_2O$) is small relative to the alkoxy groups (—OR) of the siloxane compound. The siloxane compound continues to grow in such a manner until water runs out. The time taken for advancing the second hydrolysis condensation reaction (time during which the temperature is maintained and stirring is continued) can be 2 hours or longer and 30 hours or shorter, for example.

An amount of water added in the second hydrolysis condensation reaction can be 0.5 mol or more and 1.4 mol or less based on 1 mol of $Si(OR)_4$ as the starting material. Consequently, the siloxane compound can be grown into a long thin shape, and the hydrolysis condensate of $Si(OR)_4$ (binder) can be a long chain.

An amount of the acid catalyst (for example, hydrochloric acid) added to the mixture in the second hydrolysis condensation reaction (second step) is preferably more than the amount of the acid catalyst added in the first hydrolysis condensation reaction (first step). Consequently, the molecular weight of the siloxane compound can be made larger through the second hydrolysis condensation reaction, and scratch resistance (printing durability) of the photocatalytic coating layer 5 can be improved.

A total amount of water added in the first hydrolysis condensation reaction (first step) and water added in the second hydrolysis condensation reaction (second step) can be 1.6 mol or more and 1.9 mol or less based on 1 mol of $Si(OR)_4$. Consequently, the hydrolysis condensate of $Si(OR)_4$ (binder) after reaction can have residual alkoxy groups (—OR). When the photocatalytic coating agent 2 is prepared by mixing the binder, the photocatalyst particles, and water, hydroxy groups produced through hydrolysis of the residual alkoxy groups in the photocatalytic coating agent 2 undergo dehydration condensation reaction with hydroxyl groups on the surfaces of the photocatalyst particles, and the binder and the photocatalyst particles can be chemically bonded thereby. Consequently, the photocatalyst particles can be firmly fixed by the binder.

The photocatalytic coating agent 2 can be prepared by mixing the photocatalyst particles and the binder-containing mixture obtained through the first and second hydrolysis condensation reactions (first and second steps).

A content of the binder (hydrolysis condensate of $Si(OR)_4$) in the photocatalytic coating agent 2 can be 3 wt % or more and 5 wt % or less in terms of $SiO_2$ (amount of $SiO_2$ contained in the photocatalytic coating agent 2 when all $Si(OR)_4$ moieties are changed into $SiO_2$ through hydrolysis condensation reaction).

A proportion of the binder (hydrolysis condensate of $Si(OR)_4$) in the photocatalytic coating layer 5 formed by drying the application layer 4 of the photocatalytic coating agent 2 is 30 wt % or more and 55 wt % or less, and preferably 35 wt % or more and 50 wt % or less in terms of $SiO_2$ (amount of $SiO_2$ contained in the photocatalytic coating agent 2 when all $Si(OR)_4$ moieties are changed into $SiO_2$ through hydrolysis condensation reaction).

The photocatalytic coating agent 2 may include a fluororesin. Consequently, the surface smoothness (flowability) of the photocatalytic coating layer 5 formed by drying the application layer 4 of the photocatalytic coating agent 2 can be improved, and the haze can be decreased even when the proportion of the photocatalyst particles in the photocatalytic coating layer 5 is high and an antiviral activity value is high. Furthermore, an antiviral activity value is high. Furthermore, scratch resistance (printing durability) of the photocatalytic coating layer 5 can be improved. Examples of the fluororesin include polytetrafluoroethylene (PTFE), fluorinated-ethylene-propylene (FEP), perfluoroalkoxy alkane (PFA), polyvinylidene difluoride (PVDF), ethylene tetrafluoroethylene (ETFE), polychlorotrifluoroethylene (PCTFE), and ethylenechlorotrifluoroethylene (ECTFE). A proportion of the fluororesin in the photocatalytic coating agent 2 is 0.5 wt % or more and 5 wt % or less and preferably 1 wt % or more and 4.5 wt % or less. A proportion of the fluororesin in the photocatalytic coating layer 5 is, for example, 10 wt % or more and 40 wt % or less, preferably 15 wt % or more and 35 wt % or less, and more preferably 20 wt % or more and 30 wt % or less. As the fluororesin, for example, ZEFFLE S-520, SE-300A, SE-405, SE-600, and SE-700 manufactured by Daikin Industries, Ltd., LUMIFLON FE4300, FE4400, and FE4500 manufactured by AGC Inc., and SIFCLEAR F101, F102, and F104 manufactured by Emulsion Technology Co., Ltd. can be used.

The photocatalytic coating agent 2 may include inorganic compound fine particles. Examples of the inorganic compound fine particles include zirconia fine particles, copper compound fine particles, silica fine particles, silver fine particles, and silver compound fine particles. Consequently, stability of the photocatalytic coating agent 2 can be improved. Although the reason therefor is not clear, the reason is thought to be because the zeta potential of these fine particles is reverse to that of the tungsten oxide particles. A proportion of the inorganic compound fine particles in the photocatalytic coating agent 2 is, for example, 0.01 wt % or more and 0.1 wt % or less. A proportion of the inorganic compound fine particles in the photocatalytic coating layer 5 is, for example, 0.1 wt % or more and 1.0 wt % or less.

The photocatalytic coating agent 2 may include a cyclodextrin clathrate. Consequently, stability of the photocatalytic coating agent can be improved. Although the reason therefor is not clear, the reason is thought to be because the clathrate takes up miscellaneous ions in the photocatalytic coating liquid. A proportion of the cyclodextrin clathrate in the photocatalytic coating agent 2 is, for example, 0.01 wt % or more and 0.1 wt % or less. A proportion of the cyclodextrin clathrate in the photocatalytic coating layer 5 is, for example, 0.1 wt % or more and 1.0 wt % or less.

A display device 12 is, for example, a liquid crystal display, an organic EL display, or the like. The display device 12 may be a touch panel display. The display device 12 may be an operation panel built into an apparatus such as a multifunction peripheral, or may be a smartphone display. The display device 12 can be manufactured by, for example, attaching the photocatalytic film 10 to a display 11.

Preparation of Tungsten Oxide Dispersion Liquid

Tungsten oxide ($WO_3$) raw material powder (manufactured by KISHIDA CHEMICAL Co., Ltd.) and ion-exchange water were subjected to wet milling (peripheral speed: 10 m/second, processing time: 360 minutes) using a bead mill to obtain a tungsten oxide dispersion liquid ($WO_3$: 20 wt %). The tungsten oxide particles had a primary particle diameter of about 50 nm. Hexachloroplatinum (VI) hexahydrate (manufactured by KISHIDA CHEMICAL Co., Ltd.) was added and dissolved into this tungsten oxide dispersion liquid so as to obtain 0.02 wt % of Pt—$WO_3$, causing Pt as an auxiliary catalyst to be supported on the surfaces of the tungsten oxide particles.

Synthesis of hydrolysis condensate of TEOSTetraethoxysilane (TEOS) (ethyl silicate 28, manufactured by COLCOAT CO., LTD.) was hydrolyzed and condensed to synthesize hydrolysis condensates PS1 to PS4.

Specifically, the materials for the first hydrolysis/condensation reaction shown in Table 1 were put into a 500 ml flask equipped with a stirring blade, and hydrolysis and condensation reaction was conducted for 10 hours while stirring at 100 RPM and cooling such that a liquid temperature was 10° C. Thereafter, the materials for the second hydrolysis/condensation reaction shown in Table 1 were further added to this flask, and hydrolysis and condensation reaction was conducted for 10 hours while stirring at 100 RPM and cooling such that a liquid temperature was 10° C. With respect to the hydrolysis condensate PS4, hydrolysis and condensation reaction was conducted for 20 hours without adding additional materials for the second hydrolysis/condensation reaction. Table 1 also shows blending ratios in the hydrolysis condensate compositions. The blending ratio of TEOS is an amount in terms of $SiO_2$ (amount after TEOS is fully changed into $SiO_2$ as hydrolysis reaction and condensation reaction advance).

Since the mole ratio of water (total addition amount) to TEOS in the first and second hydrolysis/condensation reactions is 1.73, the hydrolysis condensates PS1 to PS4 are considered to have residual ethoxy groups. In addition, the substantially whole amount of water in each of the hydrolysis condensates PS1 to PS4 is considered to be consumed through the first and second hydrolysis/condensation reactions. Incidentally, 2 mol of water is required per 1 mol of TEOS in order to hydrolyze all ethoxy groups of TEOS.

Viscosity Measurement 1

Viscosities of the hydrolysis condensates PS1 to PS4 were measured using a viscometer. Measurement results are shown in Table 1. While the viscosities of the hydrolysis condensates PS1 to PS3 were 3.0 cps or less, the viscosity of the hydrolysis condensate PS4 was 5.6 cps. It is considered that since the mole ratio of water to TEOS in the first hydrolysis/condensation reaction is as high as 1.73, the siloxane compound grows three-dimensionally in the hydrolysis condensate PS4. As a result, the viscosity of the hydrolysis condensate PS4 is considered to have increased.

It is considered that since the mole ratio of water to TEOS in the first hydrolysis/condensation reaction is as low as 1 or less, the siloxane compound grows into a long thin shape in the hydrolysis condensates PS1 to PS3. As a result, the viscosities of the hydrolysis condensates PS1 to PS3 are considered to have decreased.

Preparation of Photocatalytic Coating Agent

Photocatalytic coating agents LC1 to LC12 were prepared. Specifically, materials shown in Table 2 among a tungsten oxide dispersion liquid ($WO_3$: 20 wt %), the hydrolysis condensates PS1 to PS4 of TEOS, a lubricant (ZEFFLE S-520, manufactured by Daikin Industries, Ltd., fluororesin: 50 wt %), an inorganic compound (SRW-30, manufactured by YOO CORPORATION, inorganic compound: 0.024 wt %), a clathrate (IOSERVE P1, manufactured by NIPPOH CHEMICALS CO., LTD., diluted to 10% with water in use), distilled water, ethanol (manufactured by KISHIDA CHEMICAL Co., Ltd.) were mixed in blending amounts shown in Table 2 and stirred to prepare the coating agents LC1 to LC12. Table 2 also shows solid content concentrations of the coating agents. Table 3 shows blending ratios in the coating agents and blending ratios in terms of solid contents in the coating agents. The blending ratios of the hydrolysis condensates in Table 3 are amounts in terms of $SiO_2$ (amounts after TEOS is fully changed into $SiO_2$ as hydrolysis reaction and condensation reaction advance).

TABLE 1

| | First hydrolysis/condensation reaction | | | | | Second hydrolysis/condensation reaction | | |
|---|---|---|---|---|---|---|---|---|
| Hydrolysis condensate | TEOS (Parts by weight) | Ethanol (Parts by weight) | Water (Parts by weight) | Hydrochloric acid, 1N (Parts by weight) | Mole ratio of water based on TEOS | Ethanol (Parts by weight) | Water (Parts by weight) | Hydrochloric acid, 1N (Parts by weight) |
| PS1 | 100 | 100 | 6.5 | 0.1 | 0.75 | 65 | 8.5 | 0.2 |
| PS2 | 100 | 100 | 4.5 | 0.1 | 0.52 | 65 | 10.5 | 0.2 |
| PS3 | 100 | 100 | 8.5 | 0.1 | 0.98 | 65 | 6.5 | 0.2 |
| PS4 | 100 | 165 | 15 | 0.3 | 1.73 | — | — | — |

| | | Blending ratio | | | | | |
|---|---|---|---|---|---|---|---|
| Hydrolysis condensate | Total (Parts by weight) | TEOS in terms of $SiO_2$ | Ethanol | Water | Hydrochloric acid, 1N | Total | Viscosity (cps) |
| PS1 | 280.3 | 10.0 wt % | 84.6 wt % | 5.4 wt % | 0.1 wt % | 100 wt % | 2.5 |
| PS2 | 280.3 | 10.0 wt % | 84.6 wt % | 5.4 wt % | 0.1 wt % | 100 wt % | 2.1 |
| PS3 | 280.3 | 10.0 wt % | 84.6 wt % | 5.4 wt % | 0.1 wt % | 100 wt % | 2.9 |
| PS4 | 280.3 | 10.0 wt % | 84.6 wt % | 5.4 wt % | 0.1 wt % | 100 wt % | 5.6 |

TABLE 2

| Coating agent | Blending amount: $WO_3$ dispersion liquid (parts by weight) | Hydrolysis condensate | Lubricant S-520 (parts by weight) | Inorganic compound SRW (parts by weight) | Clathrate P1 (parts by weight) | Water (Parts by weight) |
|---|---|---|---|---|---|---|
| LC1 | 50 | PS1, 100 parts by weight | — | — | — | 60 |
| LC2 | 50 | PS2, 100 parts by weight | — | — | — | 60 |
| LC3 | 50 | PS3, 100 parts by weight | — | — | — | 60 |
| LC4 | 50 | PS4, 100 parts by weight | — | — | — | 60 |
| LC5 | 50 | PS1, 100 parts by weight | — | — | — | 100 |
| LC6 | 50 | PS1, 100 parts by weight | — | — | — | 20 |
| LC7 | 50 | PS1, 100 parts by weight | 12.5 | 50 | — | 60 |
| LC8 | 50 | PS1, 100 parts by weight | 12.5 | — | 1 | 60 |
| LC9 | 50 | PS1, 100 parts by weight | — | — | — | 450 |
| LC10 | 100 | PS1, 50 parts by weight | 12.5 | — | — | 80 |
| LC11 | 80 | PS1, 60 parts by weight | 5 | — | — | 61 |
| LC12 | 148 | PS1, 32 parts by weight | 25 | — | — | 110 |

| Coating agent | Blending amount: Ethanol (Parts by weight) | Total (Parts by weight) | Solid content concentration | Coating liquid stability: Viscosity (cps) Before being left | After being left | Change amount | Evaluation |
|---|---|---|---|---|---|---|---|
| LC1 | 40 | 250 | 8.0 wt % | 4.5 | 6.0 | 1.5 | Good |
| LC2 | 40 | 250 | 8.0 wt % | 4.2 | 5.2 | 1.0 | Good |
| LC3 | 40 | 250 | 8.0 wt % | 4.7 | 9.0 | 4.3 | Fair |
| LC4 | 40 | 250 | 8.0 wt % | 5.1 | 15.9 | 10.8 | Poor |
| LC5 | 0 | 250 | 8.0 wt % | 5.0 | 9.2 | 4.2 | Fair |
| LC6 | 80 | 250 | 8.0 wt % | 4.3 | 8.9 | 4.6 | Fair |
| LC7 | 40 | 312.5 | 8.4 wt % | 5.5 | 7.1 | 1.6 | Good |
| LC8 | 40 | 263.5 | 10.0 wt % | 5.6 | 7.2 | 1.6 | Good |
| LC9 | 550 | 1150 | 1.7 wt % | 1.2 | 1.3 | 0.1 | Good |
| LC10 | 150 | 392.5 | 8.0 wt % | 5.7 | 8.5 | 2.8 | Good |
| LC11 | 100 | 306 | 8.0 wt % | 5.1 | 7.1 | 2.0 | Good |
| LC12 | 250 | 565 | 8.0 wt % | 5.9 | 11.5 | 5.6 | Fair |

| Coating agent | Blending ratio (coating agent): $WO_3$ | Hydrolysis condensate (in terms of $SiO_2$) | Fluororesin (lubricant) | Inorganic compound or clathrate | Water | Ethanol | Total |
|---|---|---|---|---|---|---|---|
| LC1 | 4.0 wt % | 4.0 wt % | 0.0 wt % | 0.00 wt % | 42.2 wt % | 49.8 wt % | 100 wt % |
| LC2 | 4.0 wt % | 4.0 wt % | 0.0 wt % | 0.00 wt % | 42.2 wt % | 49.8 wt % | 100 wt % |
| LC3 | 4.0 wt % | 4.0 wt % | 0.0 wt % | 0.00 wt % | 42.2 wt % | 49.8 wt % | 100 wt % |
| LC4 | 4.0 wt % | 4.0 wt % | 0.0 wt % | 0.00 wt % | 42.2 wt % | 49.8 wt % | 100 wt % |
| LC5 | 4.0 wt % | 4.0 wt % | 0.0 wt % | 0.00 wt % | 58.2 wt % | 33.8 wt % | 100 wt % |
| LC6 | 4.0 wt % | 4.0 wt % | 0.0 wt % | 0.00 wt % | 26.2 wt % | 65.8 wt % | 100 wt % |
| LC7 | 3.2 wt % | 3.2 wt % | 2.0 wt % | 0.04 wt % | 50.1 wt % | 39.9 wt % | 98 wt % |
| LC8 | 3.8 wt % | 3.8 wt % | 2.4 wt % | 0.04 wt % | 42.7 wt % | 47.3 wt % | 100 wt % |
| LC9 | 0.9 wt % | 0.9 wt % | 0.0 wt % | 0.00 wt % | 43.1 wt % | 55.2 wt % | 100 wt % |
| LC10 | 5.1 wt % | 1.3 wt % | 1.6 wt % | 0.00 wt % | 43.0 wt % | 49.0 wt % | 100 wt % |
| LC11 | 5.2 wt % | 2.0 wt % | 0.8 wt % | 0.00 wt % | 42.7 wt % | 49.3 wt % | 100 wt % |
| LC12 | 5.2 wt % | 0.6 wt % | 2.2 wt % | 0.00 wt % | 42.9 wt % | 49.0 wt % | 100 wt % |

-continued

| | Blending ratio (solid content) | | | | |
|---|---|---|---|---|---|
| Coating agent | $WO_3$ | Hydrolysis condensate (in terms of $SiO_2$) | Fluororesin | Inorganic compound or clathrate | Total |
| LC1 | 50.0 wt % | 50.0 wt % | 0.0 wt % | 0.0 wt % | 100 wt % |
| LC2 | 50.0 wt % | 50.0 wt % | 0.0 wt % | 0.0 wt % | 100 wt % |
| LC3 | 50.0 wt % | 50.0 wt % | 0.0 wt % | 0.0 wt % | 100 wt % |
| LC4 | 50.0 wt % | 50.0 wt % | 0.0 wt % | 0.0 wt % | 100 wt % |
| LC5 | 50.0 wt % | 50.0 wt % | 0.0 wt % | 0.0 wt % | 100 wt % |
| LC6 | 50.0 wt % | 50.0 wt % | 0.0 wt % | 0.0 wt % | 100 wt % |
| LC7 | 37.9 wt % | 37.9 wt % | 23.7 wt % | 0.5 wt % | 100 wt % |
| LC8 | 38.0 wt % | 38.0 wt % | 23.7 wt % | 0.4 wt % | 100 wt % |
| LC9 | 50.0 wt % | 50.0 wt % | 0.0 wt % | 0.0 wt % | 100 wt % |
| LC10 | 64.0 wt % | 16.0 wt % | 20.0 wt % | 0.0 wt % | 100 wt % |
| LC11 | 65.3 wt % | 24.5 wt % | 10.2 wt % | 0.0 wt % | 100 wt % |
| LC12 | 65.3 wt % | 7.1 wt % | 27.6 wt % | 0.0 wt % | 100 wt % |

Viscosity Measurement 2

Viscosities of the photocatalytic coating agents LC1 to LC12 were measured immediately after preparation using a viscometer. In addition, after the prepared photocatalytic coating agents were left at 45° C. for seven days, viscosities of the photocatalytic coating agents LC1 to LC12 were measured again. Coating liquid stability (viscosity stability) of the photocatalytic coating agents was evaluated on the basis of these measurements. Measurement results and evaluation results are shown in Table 2.

It is considered that the viscosities of the photocatalytic coating agents LC1 to LC12 increase after being left because hydrolysis and condensation reaction of residual ethoxy groups of the hydrolysis condensates advances in the photocatalytic coating agents. In addition, it is considered that hydroxy groups produced through hydrolysis reaction of the residual ethoxy groups undergo dehydration condensation reaction with hydroxy groups on the surfaces of the tungsten oxide particles. Thus, hydrolysis condensates and tungsten oxide particles can be strongly bonded.

In Table 2, the evaluation results of the coating agents with the viscosity change amount before and after being left of less than 3 cps were represented as good, and the evaluation results of the coating agents with the viscosity change amount before and after being left of 3 cps or more and less than 10 cps were represented as fair. The evaluation result of the coating agent with the viscosity change amount before and after being left of 10 cps or more was represented as poor.

The viscosity change amount before and after being left of the photocatalytic coating agent LC4 was as high as 10.8 cps. The photocatalytic coating agent LC4 is prepared using the hydrolysis condensate PS4 (see Table 2), and it is considered that since the mole ratio of water to TEOS is as high as 1.73 in the first hydrolysis/condensation reaction (see Table 1), the siloxane compound grows three-dimensionally in the hydrolysis condensate PS4. Therefore, the siloxane compound is considered to grow three-dimensionally also in hydrolysis condensation reaction of residual ethoxy groups, and the viscosity change amount of the photocatalytic coating agent LC4 is considered to increase.

The viscosity change amounts before and after being left of the photocatalytic coating agents LC1 to LC3 and LC5 to LC12 were 6.0 cps or less. The photocatalytic coating agents LC1 to LC3 and LC5 to LC12 are prepared using the hydrolysis condensates PS1 to PS3 (see Table 2), and it is considered that since the mole ratio of water to TEOS is 1.0 or less in the first hydrolysis/condensation reaction (see Table 1), the siloxane compound grows into a long thin shape in the hydrolysis condensates PS1 to PS3. Therefore, the siloxane compound is considered to grow into a long thin shape also in hydrolysis condensation reaction of residual ethoxy groups, and the viscosity change amounts of the photocatalytic coating agents LC1 to LC3 and LC5 to LC12 are considered to be relatively small.

Preparation of Photocatalytic Film

Each of the prepared photocatalytic coating agents was applied to a surface of a PET film (COSMOSHINE 100A4360, manufactured by TOYOBO CO., LTD.) using a film applicator, and the application layer was dried at 80° C. for 10 seconds to form a photocatalytic coating layer. Thereafter, the PET film and the photocatalytic coating layer were left at room temperature for one week. In this way, photocatalytic films (Examples 1 to 12 and Comparative Example 1) each formed from a PET film and a photocatalytic coating layer were prepared. The thickness of each photocatalytic coating layer was set to be 0.15 μm, 0.7 μm, or 0.3 μm by changing the type of the film applicator used. Table 4 shows compositions of the prepared photocatalytic films and photocatalytic coating agents used for the preparation. Table 4 also shows, as Reference Example, a PET film in which no photocatalytic coating layer is formed.

TABLE 4

| | Film configuration | | | | Antiviral activity | | |
|---|---|---|---|---|---|---|---|
| | | Photocatalytic coating layer | | | Antiviral | | |
| Photocatalytic film | Base film | Coating agent | Film thickness | Haze | activity value | Evaluation | Comprehensive evaluation |
| Referenece Example | PET film | — | — | Excellent | 0.0 | Poor | Poor |
| Example 1 | PET film | LC1 | 0.7 µm | Good | 2.5 | Fair | Good |
| Example 2 | PET film | LC2 | 0.7 µm | Good | 2.4 | Fair | Good |
| Example 3 | PET film | LC3 | 0.7 µm | Fair | 2.6 | Fair | Good |
| Comparative Example 1 | PET film | LC4 | 0.7 µm | Poor | 2.4 | Fair | Poor |
| Example 4 | PET film | LC5 | 0.7 µm | Fair | 2.5 | Fair | Good |
| Example 5 | PET film | LC6 | 0.7 µm | Fair | 2.4 | Fair | Good |
| Example 6 | PET film | LC7 | 0.7 µm | Good | 3.6 | Good | Good |
| Example 7 | PET film | LC8 | 0.7 µm | Good | 3.4 | Good | Good |
| Example 8 | PET film | LC9 | 0.15 µm | Good | 2.2 | Fair | Good |
| Example 9 | PET film | LC1 | 3.0 µm | Fair | 3.2 | Good | Good |
| Example 10 | PET film | LC10 | 0.7 µm | Fair | 3.4 | Good | Good |
| Example 11 | PET film | LC11 | 0.7 µm | Good | 3.3 | Good | Good |
| Example 12 | PET film | LC12 | 0.7 µm | Fair | 3.5 | Good | Good |

Haze Measurement

Haze (cloudiness) Z (%) of the photocatalytic films of Examples 1 to 12 and Comparative Example 1 and of the PET film as Reference Example were measured using a haze meter "NDH7000" manufactured by NIPPON DENSHOKU INDUSTRIES Co., LTD. Haze is a value calculated from the ratio of diffused transmission light to total light transmission light and is affected by film surface roughness. The higher the haze is, the cloudier the film becomes, and the lower the transparency is.

Measurement results are shown in Table 4. In Table 4, the film rated as "Excellent" had haze Z of 2 or less, the films rated as "Good" had haze Z of more than 2 and 3 or less, the films rated as "Fair" had haze Z of more than 3 and less than 4, and the film rated as "Poor" had haze Z of 4 or more. Among these films, films having haze of less than 4 (films rated as excellent, good, or fair) were judged as being excellent in transparency.

The photocatalytic films of Examples 1 to 12 have photocatalytic coating layers formed using any of the photocatalytic coating agents LC1 to LC3 and LC5 to LC12 (see Table 4), and the coating agents LC1 to LC3 and LC5 to LC12 are prepared using any of the hydrolysis condensates PS1 to PS3 (see Table 2). It is considered that since the mole ratio of water to TEOS is 1.0 or less in the first hydrolysis/condensation reaction (see Table 1), the siloxane compound is considered to grow into a long thin shape in the hydrolysis condensates PS1 to PS3. As a result, the viscosities of the coating agents decrease, and it is considered that the surface roughness of the photocatalytic coating layers of the photocatalytic films of Examples 1 to 12 got smaller, resulting in lower haze.

The photocatalytic film of Comparative Example 1 has a photocatalytic coating layer formed using the photocatalytic coating agent LC4 (see Table 4), and the coating agent LC4 is prepared using the hydrolysis condensate PS4 (see Table 2). It is considered that since the mole ratio of water to TEOS is 1.73 in the first hydrolysis/condensation reaction (see Table 1), and the hydrolysis/condensation reaction is advanced in one step, the siloxane compound grows three-dimensionally in the hydrolysis condensate PS4. As a result, the viscosity of the coating agent LC4 increases, and it is considered that the surface roughness of the photocatalytic coating layer of the photocatalytic film of Comparative Example 1 gets larger, resulting in higher haze.

Antiviral Test

Antiviral activity values of the photocatalytic films of Examples 1 to 12 and Comparative Example 1 and of the PET film as Reference Example were measured by the method in accordance with JIS R 1756: 2020.

Measurement results are shown in Table 4. In antiviral evaluation in Table 4, the films with an antiviral activity value of 3 or more are represented as "Good," the films with an antiviral activity value of 2 or more and less than 3 are represented as "Fair," and the film with an antiviral activity value of less than 2 is represented as "Poor."

Comprehensive Evaluation

Table 4 also shows comprehensive evaluation results. In the multiple evaluation items shown in Table 4, the films having at least one evaluation item rated as "Poor" were comprehensively evaluated as "Poor," and the films having no evaluation item rated as "Poor" were comprehensively evaluated as "Good."

What is claimed is:

1. A photocatalytic coating agent, comprising:

a liquid medium;

photocatalyst particles;

a binder; and a cyclodextrin clathrate or a fluororesin, wherein the binder is a hydrolysis condensate of a tetraalkoxysilane and comprises a long-chain siloxane compound.

2. The photocatalytic coating agent according to claim 1, wherein the binder has a polymer structure with which a viscosity at 20° C. of a dispersion liquid, in which 10 wt % of the hydrolysis condensate is dispersed in ethanol, is 2.0 cps or more and 4.0 cps or less.

3. The photocatalytic coating agent according to claim 1, wherein the photocatalytic coating agent has a viscosity of 1.0 cps or more and 10.0 cps or less.

4. The photocatalytic coating agent according to claim 1, wherein the liquid medium includes water and an alcohol, and a weight ratio of the alcohol in the photocatalytic coating agent is 20 wt % or more and 70 wt % or less.

5. The photocatalytic coating agent according to claim 1, further comprising inorganic compound fine particles, wherein the inorganic compound fine particles include one or more of zirconia fine particles, copper fine particles, silica fine particles, silver fine particles, and silver compound fine particles.

6. A photocatalytic film, comprising:

a base film; and a photocatalytic coating layer provided on the base film, wherein the photocatalytic coating layer is obtained by drying an application layer of the photocatalytic coating agent according to claim 1.

7. The photocatalytic film according to claim 6, wherein a thickness of the photocatalytic coating layer is 0.1 μm or more and 5.0 μm or less.

8. The photocatalytic film according to claim 6, wherein the photocatalytic coating layer includes the fluororesin, and a content of the fluororesin in the photocatalytic coating layer is 10 wt % or more and 40 wt % or less.

9. A display device comprising the photocatalytic film according to claim 6.

10. A binder synthesis method, comprising:

mixing a tetraalkoxysilane, an alcohol, and water, and advancing hydrolysis reaction and dehydration condensation reaction to form a mixture, and adding water to the mixture, and further advancing hydrolysis reaction and dehydration condensation reaction, wherein a mixing ratio between the tetraalkoxysilane and the water is set such that an amount of the water is 0.5 mol or more and 1 mol or less based on 1 mol of the tetraalkoxysilane.

11. The binder synthesis method according to claim 10, wherein the mixing further comprises adding an acid catalyst with the tetraalkoxysilane, the alcohol, and the water, and the hydrolysis reaction and the dehydration condensation reaction is advanced at a temperature equal to or more than a freezing temperature and equal to or less than 20° C.

12. The binder synthesis method according to claim 10, wherein the mixing further comprises adding an acid catalyst with the tetraalkoxysilane, the alcohol, and the water, the adding water to the mixture further comprises adding additional acid catalyst to the mixture, and an amount of the additional acid catalyst is larger than an amount of the acid catalyst.

* * * * *